United States Patent
Tomita et al.

(10) Patent No.: US 8,345,294 B2
(45) Date of Patent: Jan. 1, 2013

(54) DOCUMENT ADMINISTRATION SYSTEM, DOCUMENT ADMINISTRATION APPARATUS, AND RECORDING MEDIUM

(75) Inventors: Atsushi Tomita, Toyohashi (JP); Eiichi Yoshida, Hoi-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1660 days.

(21) Appl. No.: 11/375,443

(22) Filed: Mar. 15, 2006

(65) Prior Publication Data

US 2006/0221390 A1 Oct. 5, 2006

(30) Foreign Application Priority Data

Apr. 4, 2005 (JP) .................................. 2005-107768

(51) Int. Cl.
| | |
|---|---|
| *G06K 15/00* | (2006.01) |
| *G06F 3/12* | (2006.01) |
| *H04N 1/60* | (2006.01) |
| *H04N 1/40* | (2006.01) |
| *H04N 5/36* | (2006.01) |
| *H04N 1/00* | (2006.01) |
| *G06T 5/00* | (2006.01) |

(52) U.S. Cl. ........ 358/1.16; 358/1.15; 358/1.9; 358/2.1; 358/3.26; 358/3.28; 358/537; 358/400; 358/401; 358/443; 358/448

(58) Field of Classification Search .................. 358/1.16, 358/1.15, 1.9, 2.1, 3.26, 3.28, 537, 400, 401, 358/443, 448

See application file for complete search history.

(56) References Cited

U.S. PATENT DOCUMENTS

| 7,426,049 B2 * | 9/2008 | Peter et al. .................... 358/1.15 |
| 7,437,366 B2 * | 10/2008 | Matsuzawa et al. .................. 1/1 |
| 2004/0059740 A1 * | 3/2004 | Hanakawa et al. ........... 707/100 |

FOREIGN PATENT DOCUMENTS

| JP | 11-196206 | 7/1999 |
| JP | 11-239238 | 8/1999 |

* cited by examiner

*Primary Examiner* — Steven Kau
*Assistant Examiner* — Neil R McLean
(74) *Attorney, Agent, or Firm* — Buchanan Ingersoll & Rooney PC

(57) ABSTRACT

A document administration system includes a server connecting document storing apparatuses via a network. Each document storing apparatus includes a plurality of boxes, and a document storing portion for making the document storing apparatus store a document in one of the boxes. The server includes a storing destination deciding portion for deciding one of the document storing apparatuses and one of the boxes thereof for storing the document, based on one or more of information including information on the document corresponding to the storing request, information on the document storing apparatuses registered in a document storing registering portion, and information on the boxes obtained by a box information obtaining portion, and a controller for transmitting the document to the document storing apparatuses having the one of the boxes selected by the storing destination deciding portion and making the document storing portion store the document in the one of the boxes.

19 Claims, 14 Drawing Sheets

Stored document administration list

| Virtual box number | Image forming apparatus IP address | Box number | Document number | Document name |
|---|---|---|---|---|
| 3 | 10.192.168.2 | 232 | 3811 | document1.doc |
| 5 | 10.192.168.1 | 433 | 1244 | business.xls |
| 17 | 10.192.168.5 | 8435 | 3858 | Profit.xls |
| 123 | 10.192.168.1 | 1134 | 1001 | Project.doc |
| 2255 | 10.192.168.1 | 989 | 232 | memo.txt |
| ⋮ | ⋮ | ⋮ | ⋮ | ⋮ |
| | | | | |

FIG.9

Image forming apparatus administration list

| Apparatus name | IP address | Color attribution | Productivity rate |
|---|---|---|---|
| Derby | 10.192.168.1 | Color | 22 |
| Fortune | 10.192.168.2 | BW | 35 |
| Tornado | 10.192.168.3 | BW | 60 |
| Valium | 10.192.168.4 | Color | 35 |
| Tomas | 10.192.168.5 | Color | 24 |
| ⋮ | ⋮ | ⋮ | ⋮ |
|  |  |  |  |

FIG.12

DOCUMENT ADMINISTRATION SYSTEM, DOCUMENT ADMINISTRATION APPARATUS, AND RECORDING MEDIUM

This application claims priority under 35 U.S.C. § 119 to Japanese Patent Application No. 2005-107768 filed on Apr. 4, 2005, the entire disclosure of which is incorporated herein by reference in its entirety.

BACKGROUND OF THE INVENTION

1. Field of the Invention

The present invention relates to a document administration system in which a plurality of document storing apparatuses each having a box function capable of storing information such as documents (including image data) in a sorted manner and a server apparatus which is a document administering apparatus are connected with each other via a network. The present invention also relates to a document administering apparatus used in the system, and a document administering program.

2. Description of the Related Art

The following description sets forth the inventor's knowledge of related art and problems therein and should not be construed as an admission of knowledge in the prior art.

A recent image forming apparatus which is one of document storing apparatuses has a function of once storing electronic data in a storing device such as a hard disk and then printing out the data at the timing required by a user as well as a function of immediately printing out received print data or facsimile data.

Furthermore, in another image forming apparatus, the electronic data is stored in a divided storing area called "box" every user or group.

As for the technique regarding such box, Japanese Unexamined Laid-open Patent Publication No. H11-196206 discloses a facsimile apparatus in which received facsimile information is sorted and stored in a divided destination dedicated box every destination recognized from the information.

Furthermore, Japanese Unexamined Laid-open Patent Publication No. H11-239238 discloses a facsimile apparatus. According to this facsimile apparatus, when a confidential document is received, the confidential document is stored in a personal box of the confidential destination user and the stored destination of this confidential document is registered in its Web server. Thereafter, the fact that it received the confidential document is notified to the confidential destination user by e-mail. When the confidential destination user who received the notification accesses the facsimile apparatus from the personal computer and inputs his/her ID and password, the linked destination to the confidential document is notified so that the user can browse the confidential document.

Furthermore, as an image forming apparatus equipped with such a box technique, there exists an image forming apparatus equipped with the so-called "private box" which is protected so as to allow an access of a specified user or group using a password. Moreover, there also exists an image forming apparatus equipped with two types of boxes, i.e., a private box and the so-called "public box" with no access limitation in view of the usability.

In the meantime, in some middle or large size offices, a plurality of image forming apparatuses are installed in one floor. In such an office, when such image forming apparatus having the aforementioned box function becomes popular, a user may hesitate over which box of which image forming apparatus to use for storing a document, resulting in an inconvenient system.

Furthermore, in the case of outputting a document stored in a box of an image forming apparatus, it is required to operate each image forming apparatus which stores the document, which is inconvenient.

Furthermore, in the case of discarding an image forming apparatus, it is required to move documents stored in the boxes of the image forming apparatus, which is also inconvenient.

However, in conventionally available technique utilizing boxes including the technique disclosed in the aforementioned patent documents, no proposal for solving the aforementioned problems or enhancing the usability has been made.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a document administration system in which a user would not hesitate over which box of which image forming apparatus to use for storing a document even in cases where a plurality of document storing apparatuses such as image forming apparatuses each having a box function are installed in an office and it is convenient for a user in the case of outputting a document stored in a box of an image forming apparatus or in the case of discarding an image forming apparatus.

Among other potential advantages, some embodiments can provide a document administration apparatus used in the system.

Among other potential advantages, some embodiments can provide a recording medium in which document administering program for making a computer execute document administering processing used in the system.

According to a first aspect of the preferred embodiment of the present invention, a document administration system, comprising:

a plurality of document storing apparatuses; and a server apparatus connected the plurality of document storing apparatuses via a network, wherein each of the plurality of document storing apparatuses includes:

a plurality of boxes for storing various information in a sorted manner; and a document storing portion for making the document storing apparatus store a document in one of the boxes, wherein the server apparatus includes:

a document storing apparatus registering portion for registering information on each of the document storing apparatuses;

a box information obtaining portion for obtaining information on the boxes from each of the document storing apparatuses;

a storing request receiving portion for receiving a storing request of the document;

a storing destination deciding portion for deciding one of the document storing apparatuses and one of the boxes thereof for actually storing the document, based on any one or more of information including information on the document corresponding to the storing request, information on the document storing apparatuses registered in the document storing apparatus registering portion, and information on the boxes obtained by the box information obtaining portion; and a controller for transmitting the document to the one of the document storing apparatuses having the one of the boxes selected by the storing destination deciding portion and making the document storing portion store the document in the one of the boxes.

According to a second aspect of the preferred embodiment of the present invention, a document administration system in which a plurality of document storing apparatuses and a server apparatus are connected via a network, wherein each of the plurality of document storing apparatuses include:

a plurality of boxes for storing various information in a sorted manner; and a document storing portion for making the document storing apparatus store in one of the boxes thereof, wherein the server apparatus includes:

an output request receiving portion for receiving an output request on a document stored in one of the document storing apparatuses;

an output destination selecting portion for selecting one of the document storing apparatuses for actually outputting the document corresponding to the output request among the plurality of document storing apparatuses based on an instruction by a user;

a discriminating portion which discriminates whether the one of the document storing apparatuses selected by the output destination selecting portion coincides with one of the document storing apparatuses in which the document is stored; and a controller which makes the one of the document storing apparatuses output the document when the discriminating portion discriminates both the document storing apparatuses are the same, and obtains the document from the one of the document storing apparatuses in which the document is stored and transmits the obtained document to the one of the document storing apparatuses selected by the output destination selecting portion to output the document when the discriminating portion discriminates both the document storing apparatuses are not the same.

According to a third aspect of the preferred embodiment of the present invention, a document administration system in which a plurality of document storing apparatuses and a server apparatus are connected via a network, wherein each of the plurality of document storing apparatuses include:

a plurality of boxes for storing various information in a sorted manner; and a document storing portion for making the document storing apparatus store a document in one of the boxes thereof, wherein the server apparatus includes:

a document storing apparatus registering portion for registering information on each of the document storing apparatuses;

a box information obtaining portion for obtaining information on the boxes from each of the document storing apparatuses;

a document storing apparatus deleting portion for deleting information on one of the document storing apparatuses registered in the document storing apparatus registering portion; and a document transferring portion which obtains one or more documents stored in one of the document storing apparatuses and then stores the one or more obtained documents in one or more storing destinations newly decided based on any one or more of information including information on the one or more documents, information on the document storing apparatuses registered in the document storing apparatus registering portion, and box information obtained by the box information obtaining portion when the information on the one or more document storing apparatuses is deleted by the document storing apparatus deleting portion.

According to a fourth aspect of the preferred embodiment of the present invention, a document administering apparatus connected to a plurality of document storing apparatuses each having boxes for storing various information in a sorted manner via a network, the document administering apparatus comprising:

a document storing apparatus registering portion for registering information on each of the document storing apparatuses;

a box information obtaining portion for obtaining information on the boxes from each of the document storing apparatuses;

a storing request receiving portion for receiving a storing request of a document;

a storing destination deciding portion for deciding one of the document storing apparatuses and one of the boxes thereof for actually storing the document, based on any one or more of information including information on the document corresponding to the storing request, information on the document storing apparatuses registered in the document storing apparatus registering portion, and information on the boxes obtained by the box information obtaining portion; and a controller for transmitting the document to the one of the document storing apparatuses having a box decided by the storing destination deciding portion and making the document storing apparatuses store the document.

According to a fifth aspect of the preferred embodiment of the present invention, a document administering apparatus connected to a plurality of document storing apparatuses each having boxes for storing various information in a sorted manner via a network, the document administering apparatus comprising:

an output request receiving portion for receiving an output request on a document stored in one of the document storing apparatuses;

an output destination selecting portion for selecting one of the document storing apparatuses for actually outputting the document corresponding to the output request among the plurality of document storing apparatuses based on an instruction by a user;

a discriminating portion which discriminates whether the one of the document storing apparatuses selected by the output destination selecting portion coincides with one of the document storing apparatuses in which the document is stored; and a controller which makes the document storing apparatus output the document when the discriminating portion discriminates both the document storing apparatuses are the same, and obtains the document from one of the document storing apparatuses in which the document is stored and transmits the obtained document to the one of the document storing apparatuses selected by the output destination selecting portion to output the document when the discriminating portion discriminates both the document storing apparatuses are not the same.

According to a sixth aspect of the preferred embodiment of the present invention, a document administering apparatus connected to a plurality of document storing apparatuses each having boxes for storing various information in a sorted manner via a network, the document administering apparatus comprising:

a document storing apparatus registering portion for registering information on each of the document storing apparatuses;

a box information obtaining portion for obtaining information on the boxes from each of the document storing apparatuses;

a document storing apparatus deleting portion for deleting information on one of the document storing apparatuses registered in the document storing apparatus registering portion; and a document transferring portion which obtains one or more documents stored in one of the document storing apparatuses and then stores the one or more obtained documents in one or more storing destinations newly decided based on any one or more of information including information on the one or more documents, information on the document storing apparatuses registered in the document storing apparatus registering portion, and box information obtained by the box information obtaining portion when the information on the one or more document storing apparatuses is deleted by the document storing apparatus deleting portion.

According to a seventh aspect of the preferred embodiment of the present invention, a recording medium in which document administering program for making a computer execute the steps is recorded, the steps comprising:

a document storing apparatus registering step for registering information on a plurality of document storing apparatuses connected with each other to a network, each of the document storing apparatuses having boxes for storing various information in a sorted manner;

a box information obtaining step for obtaining information on the boxes from each of the document storing apparatuses;

a storing request receiving step for receiving a storing request of a document;

a storing destination deciding step for deciding one of the document storing apparatuses and one of the boxes thereof for actually storing the document, based on any one of information including information on the document corresponding to the storing request, information on the document storing apparatuses registered at the document storing apparatus registering step and information on the boxes obtained at the box information obtaining step; and a storing controlling step for transmitting the document to the one of the document storing apparatuses having the one of the boxes determined at the storing destination deciding step and making the document storing apparatuses store the document in the one of the boxes.

According to an eighth aspect of the preferred embodiment of the present invention, a recording medium in which document administration program for making a computer execute the steps is recorded, the steps comprising:

an output request receiving step for receiving an output request of a document stored in any one of a plurality of document storing apparatuses connected with each other via a network, each of the document storing apparatuses having a plurality of boxes for storing various documents in a sorted manner;

an output destination selecting step for selecting one of the document storing apparatuses for actually outputting the document corresponding to the output request among the plurality of document storing apparatuses based on an instruction of a user;

a step of discriminating whether the one of the document storing apparatuses selected at the output destination selecting step coincides with the one of the document storing apparatuses in which the document is stored; and an output control step for making the one of the document storing apparatus output the document when the discriminating portion discriminates both the document storing apparatuses are the same, and obtains the document from the one of the document storing apparatuses in which the document is stored and transmits the obtained document to the one of the document storing apparatuses selected by the output destination selecting portion to output the document when the discriminating portion discriminates both the document storing apparatuses are not the same.

According to a ninth aspect of the preferred embodiment of the present invention, a recording medium in which document administration program for making a computer execute the steps is recorded, the steps comprising:

a document storing apparatus registering step for registering information on a plurality of document storing apparatuses connected with each other via a network, each of the document storing apparatuses having boxes for storing various information in a sorted manner;

a box information obtaining step for obtaining information on one of the boxes from each of the document storing apparatuses;

a document storing apparatus deleting step for deleting the information on one of the document storing apparatuses registered at the document storing apparatus registering step; and a document transferring step for obtaining a document stored in one of the document storing apparatuses when the information on the one of the document storing apparatuses is deleted by the document storing apparatus deleting portion and then storing the obtained document in a storing destination newly decided based on any one or more of information including information on the document, information on the document storing apparatuses registered in the document storing apparatus registering portion, and box information obtained by the box information obtaining portion.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 9 is a table showing an example of a stored document administration list registered in the server apparatus 4;

FIG. 12 is a table showing an example of an image forming apparatus administration list stored in the server apparatus;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
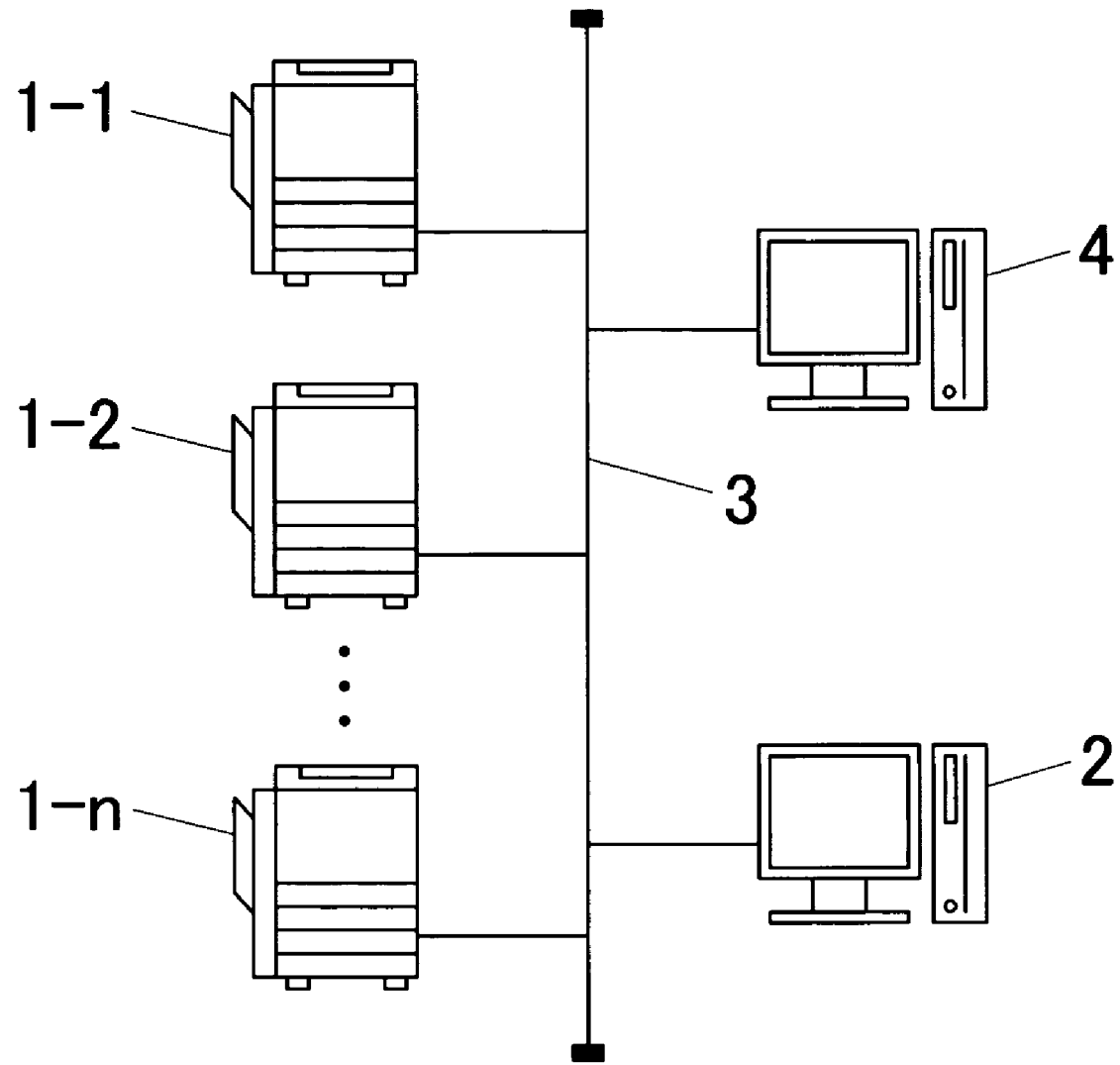
FIG. 1 is a schematic view showing the structure of a document administration system according to an embodiment of the present invention.

FIG. 1 is a structural explanatory view showing a document administration system including document storing apparatuses and a server apparatus according to an embodiment of the present invention.

This system is constituted by a plurality of image forming apparatuses 1-x (x:1-n) as document storing apparatuses, a terminal apparatus 2, and a server apparatus 4 as a document administration apparatus. The image forming apparatuses 1-x (x:1-n), the terminal apparatus 2 and the server apparatus 4 are connected with each other via a network 3.

The network 3 can be any one of networks including a network using dedicated lines such as an LAN (Local Area Network), a network using public lines and a wireless network.

The image forming apparatus 1-x (x:1-n) is an apparatus for forming a scanned original document image and a copied image of an image created from print data transmitted from the terminal apparatus 2. The scanned original document image can be transmitted to the terminal apparatus 2 or another image forming apparatus, for example.

The terminal apparatus 2 is a normal computer equipped with a CPU, a RAM, a fixed storage, a monitor, a keyboard, a mouse, etc. The terminal apparatus 2 is used to transmit various requests, such as a document print request, a document store request, and a document output request, to the server apparatus 4.

Figure 2:
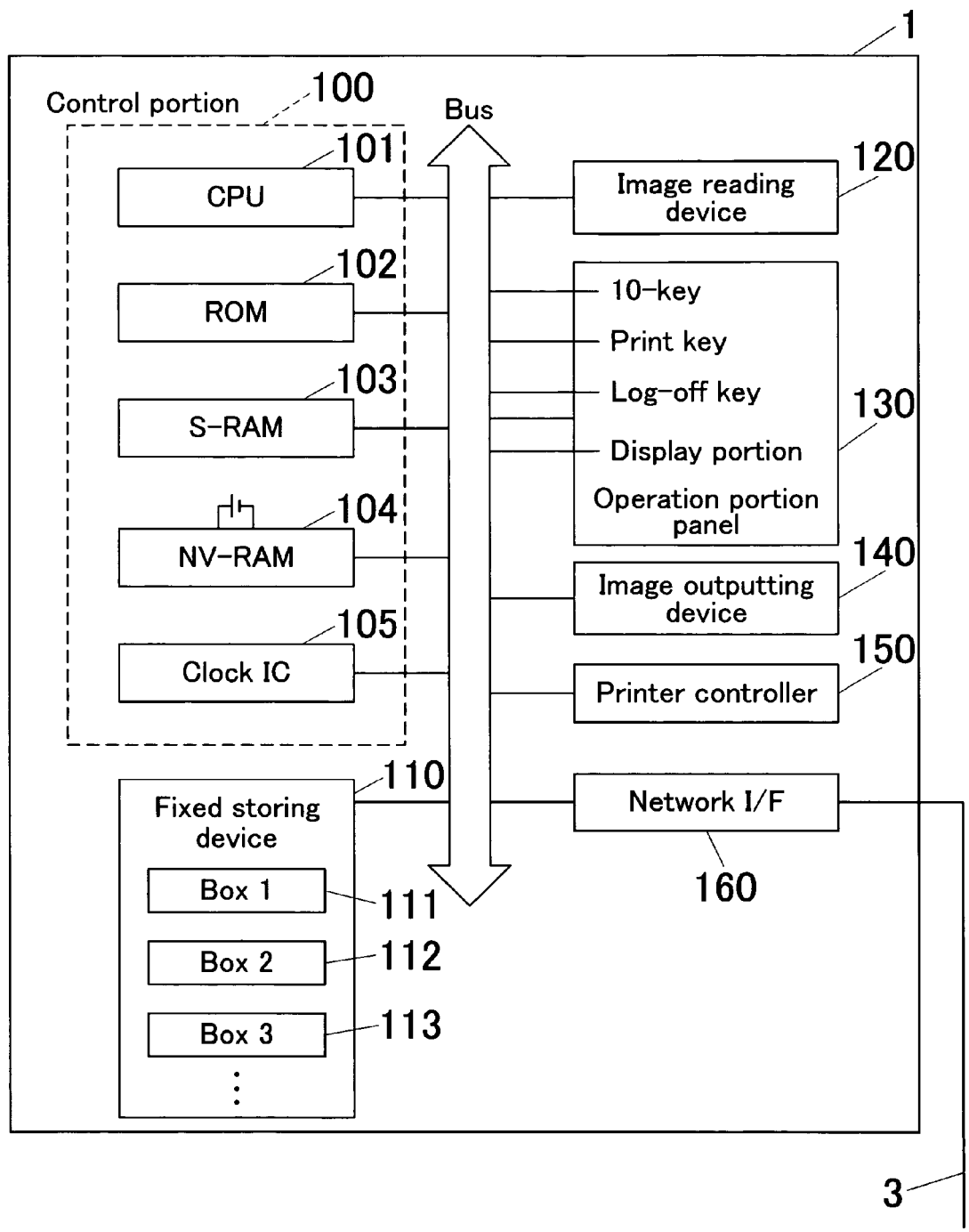
FIG. 2 is a view showing the internal structure of an image forming apparatus 1-$x$ (x:1-$n$) used in the system shown in FIG. 1.

FIG. 2 shows the internal structure of the image forming apparatus 1-x (x:1-n).

To the CPU 101, a ROM 102 storing control program, a working S-RAM (Static Random Access Memory) 103, a battery-backup NV-RAM 104 (nonvolatile memory) for storing various settings regarding image forming, and a clock IC 105 having a calendar function are connected via a bus. These components constitute a control portion 100.

To the control portion 100, an image reading device 120 for reading an original document, an operation panel 130 equipped with keys for performing various input operations and a display portion, a network interface 160 (hereinafter referred to as "network I/F") for exchanging various information among external apparatuses such as the image forming apparatuses 1-x (x:1-n) and the terminal apparatus 2 connected via the network 3, a printer controller 150 for creating a copied image from the print data received via the network I/F 160, and an image outputting device 140 for forming a copied image on a paper, are connected via the bus.

To the control portion 100, a fixed storing device 110 is connected via the bus. An example of the fixed storing device 110 is a hard disk device.

The fixed storing device 110 is provided with "boxes" 111, 112, 113 . . . , which are divided storing areas, and is capable of storing an original document image read by the image reading device 120, a copied image created from the print data transmitted from the terminal apparatus 2 and/or various information in the boxes as a document. The documents stored in the boxes can be printed out or transmitted to the terminal apparatus 2 via the network I/F 160.

The boxes 111, 112, 113 . . . can be classified into two types, i.e., a "public box" which does not limit an access to documents stored therein and a "private box" which only allows an access to documents by a specific user or user group. The private box is constituted so as to limit an access with a password for example. By allotting a password to a certain user or group, only the user or group is allowed to access the documents stored in the box.

The fixed storing device 110 can have one or more public boxes and one or more private boxes. Each box can be uniquely identified by a box number. In place of the box number, a box name can be used so that a user can easily identify the box.

Both in the public box and the private box, each box can store one or more documents. To identify a document to be stored in one of the boxes, a document number uniquely allotted over the boxes is given to the document. Like the box number, the document number can be replaced with a document name.

The boxes 111, 112, 113 . . . are created by operations at the operation panel 130. At this time, a box number, a box name and a box type (i.e., public box or private box) are inputted via the operation panel 130 and then stored in the fixed storing device 110. In the case of a private box, a password is further inputted and stored in the fixed storing device 110. Furthermore, the boxes can be deleted by the operation at the operation panel 130.

The server device 4 creates print data based on a print request from the terminal apparatus 2 and transfers the print data to the designated image forming apparatus 1-*x* (x:1-*n*). Furthermore, as will be detailed later, the server device 4 receives various requests and executes predetermined processing.

Figure 3:
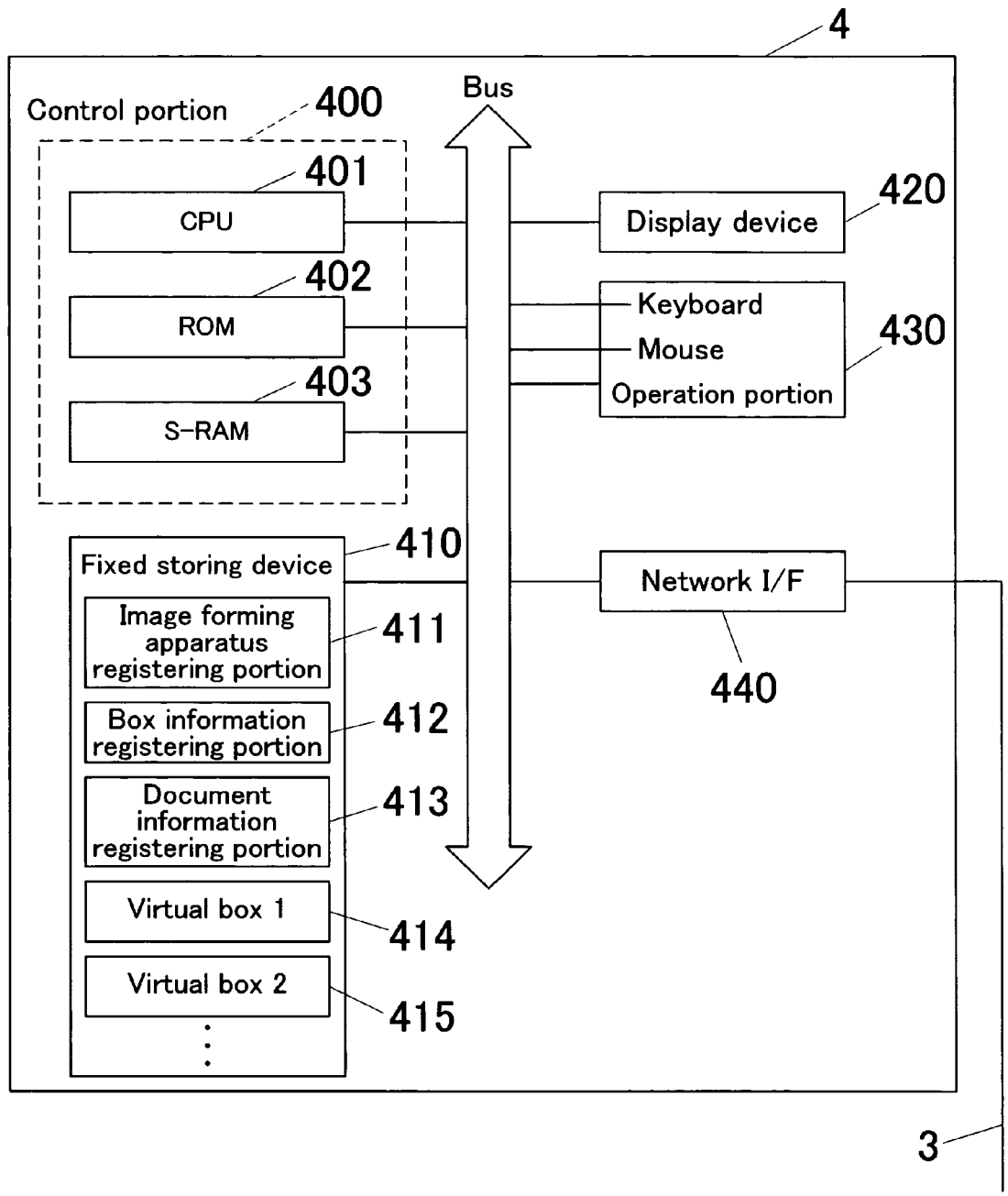
FIG. 3 is a view showing the internal structure of a server apparatus used in the system shown in FIG. 1.

FIG. 3 shows the internal structure of the server apparatus 4.

To the CPU 401 of the server device 4, a ROM 402 storing control program including document administration program and a working S-RAM (Static Random Access Memory) 403 are connected via a bus. These components constitute a control portion 400.

To the control portion 400, a display device 420 such as a CRT or an LCD, an operation portion 430 equipped with a keyboard and a mouse for performing various input operations and a network I/F 440 for exchanging various information among image forming apparatuses 1-*x* (x:1-*n*) are connected via a bus.

Further connected to the control portion 400 via the bus is a fixed storing device 410. An example of the fixed storing device 410 is a hard disk device.

The fixed storing device 410 is provided with an image forming apparatus registering portion 411 for registering the information on the image forming apparatuses 1-*x*(x:1-*n*) as an administration list, a box information registering portion 412 for registering the information on the boxes 111, 112, 113 . . . of each image forming apparatus 1-*x*(x:1-*n*) and a document information registering portion 413 for registering the information of the stored document as an administration list. The CPU 401 of the control portion 400 routinely obtains the information on each box of each image forming apparatus 1-*x* (x:1-*n*), and each obtained box information is registered in the administration list of the box information registering portion 412.

Furthermore, the fixed storing device 410 is provided with a plurality of boxes 414, 415 . . . . These boxes function as virtual boxes which will not be actually used to store documents but designated as document storing destinations when a user made a document storing request from the terminal apparatus 2.

Next, the entire processing flow among the terminal apparatus 2, the server apparatus 4 and the image forming apparatuses 1-*x* (x:1-*n*) will be explained with reference to FIGS. 4 to 6.

Figure 4:
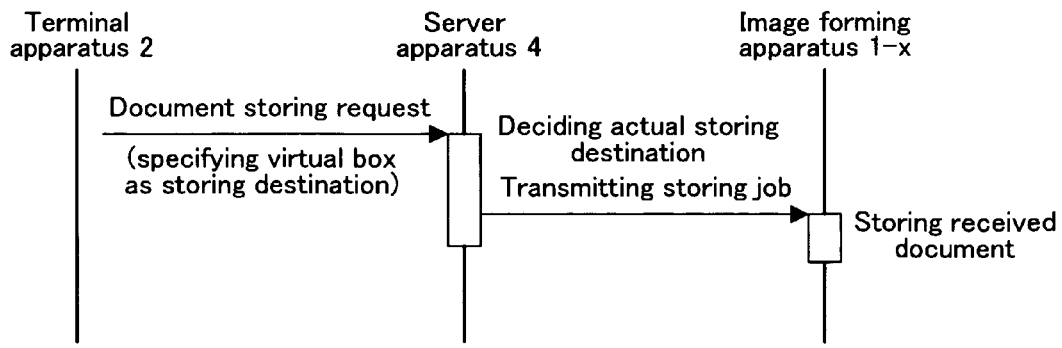
FIG. 4 is view showing a processing flow to be executed when a document storing request is made in the system shown in FIG. 1.

1) Storing a Document in a Virtual Box (FIG. 4)

When a user instructs storing of a document in any one of the virtual boxes 414, 415 . . . , the document storing request is transmitted from the terminal apparatus 2 to the server apparatus 4. At this time, the terminal apparatus 2 designates one of the virtual boxes from the virtual boxes 414, 415 . . . registered in the server apparatus 4.

Receiving this storing request, the server apparatus 4 designates one of the image forming apparatuses as a storing destination which will actually store the document and one of the boxes registered therein based on any one of the information including the information on the received document, the information on the image forming apparatuses 1-*x*(x:1-*n*) registered in the image forming apparatus registering portion 411 and the information on the boxes 111, 112, 113 . . . of each of the image forming apparatuses 1-*x*(x:1-*n*) registered in the box information registering portion 412. Thereafter, the server apparatus 4 transmits the document to the image forming apparatus which is a storing destination as a storing job.

The image forming apparatus which received the storing job stores the received document in the designated box.

2) Outputting the Document Stored in the Virtual Box

When a user instructs outputting of the document stored in the virtual box, the terminal apparatus 2 transmits an output request of the stored document to the server apparatus 4. At this time, the outputting image forming apparatus 1-*x*(x:1-*n*) is designated by the user and notified to the server apparatus 4.

Figure 5:
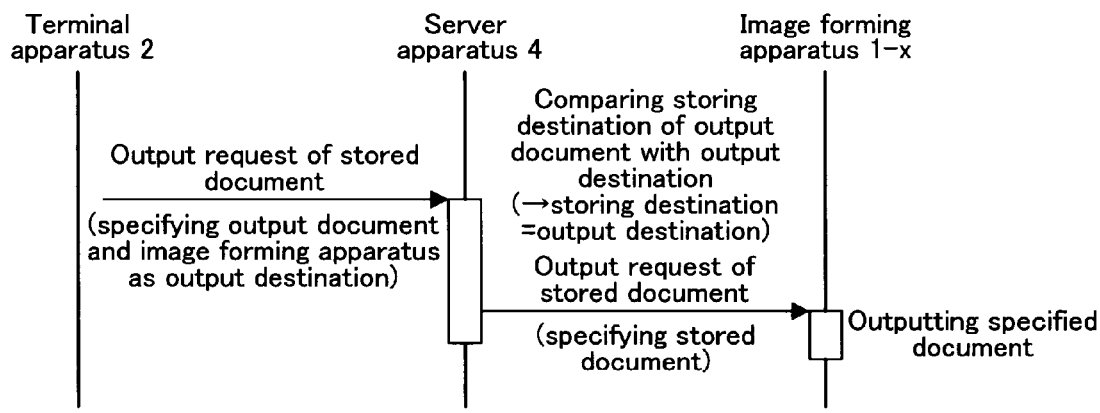
FIG. 5 is a view showing a processing flow to be executed when a document output request is made in the system shown in FIG. 1.
Figure 5:
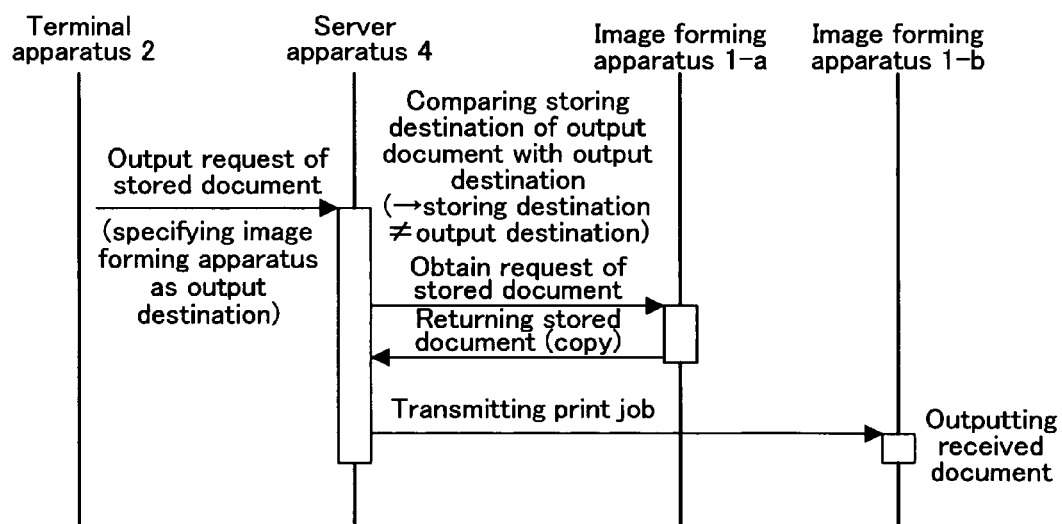

In cases where the outputting image forming apparatus 1-*x*(x:1-*n*) is an image forming apparatus actually storing the document requested to be outputted (in the case a) of FIG. 5A, the server apparatus 4 requests the image forming apparatus to output the document. To the contrary, in cases where the outputting image forming apparatus 1-*x*(x:1-*n*) is not an image forming apparatus actually storing the document requested to be outputted (in the case b) of FIG. 5), the server apparatus 4 obtain the document from the image forming apparatus actually storing the document and then transmits it to the outputting image forming apparatus to make the image forming apparatus output it.

Figure 6:
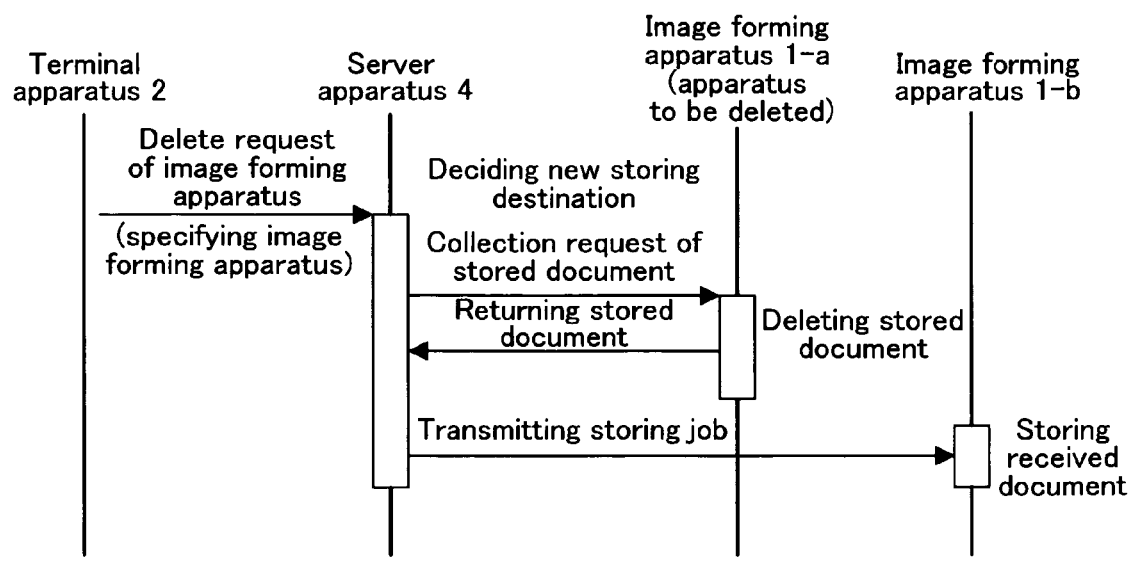
FIG. 6 is a view showing a processing flow to be executed to move a stored document when information on an image forming apparatus registered in the server apparatus is deleted in the system shown in FIG. 1.

3) Moving a Stored Document Due to Deletion of an Image Forming Apparatus (FIG. 6)

When a user instructs deletion of the information on the image forming apparatus registered in the image forming apparatus registering portion of the server apparatus 4, the deletion request of the image forming apparatus is transmitted to the server apparatus 4.

The server apparatus 4 decides a moving destination of the document stored in the image forming apparatus requested to be deleted, based on any one of information including the information on the stored document, the information on the other image forming apparatuses registered in the image forming apparatus registering portion 411 and the information on the boxes of each of the other image forming apparatuses registered in the box information registering portion 411. Thereafter, the server apparatus 4 obtain one-by-one the documents stored in the image forming apparatus required to be deleted and transmits the obtained documents to the destination image forming apparatus to store therein.

Next, the processing to be executed in the server apparatus 4 and the image forming apparatus 1-*x* (x1-*n*) will be detailed.

[1] Entire Processing of the Server Apparatus 4

Figure 7:
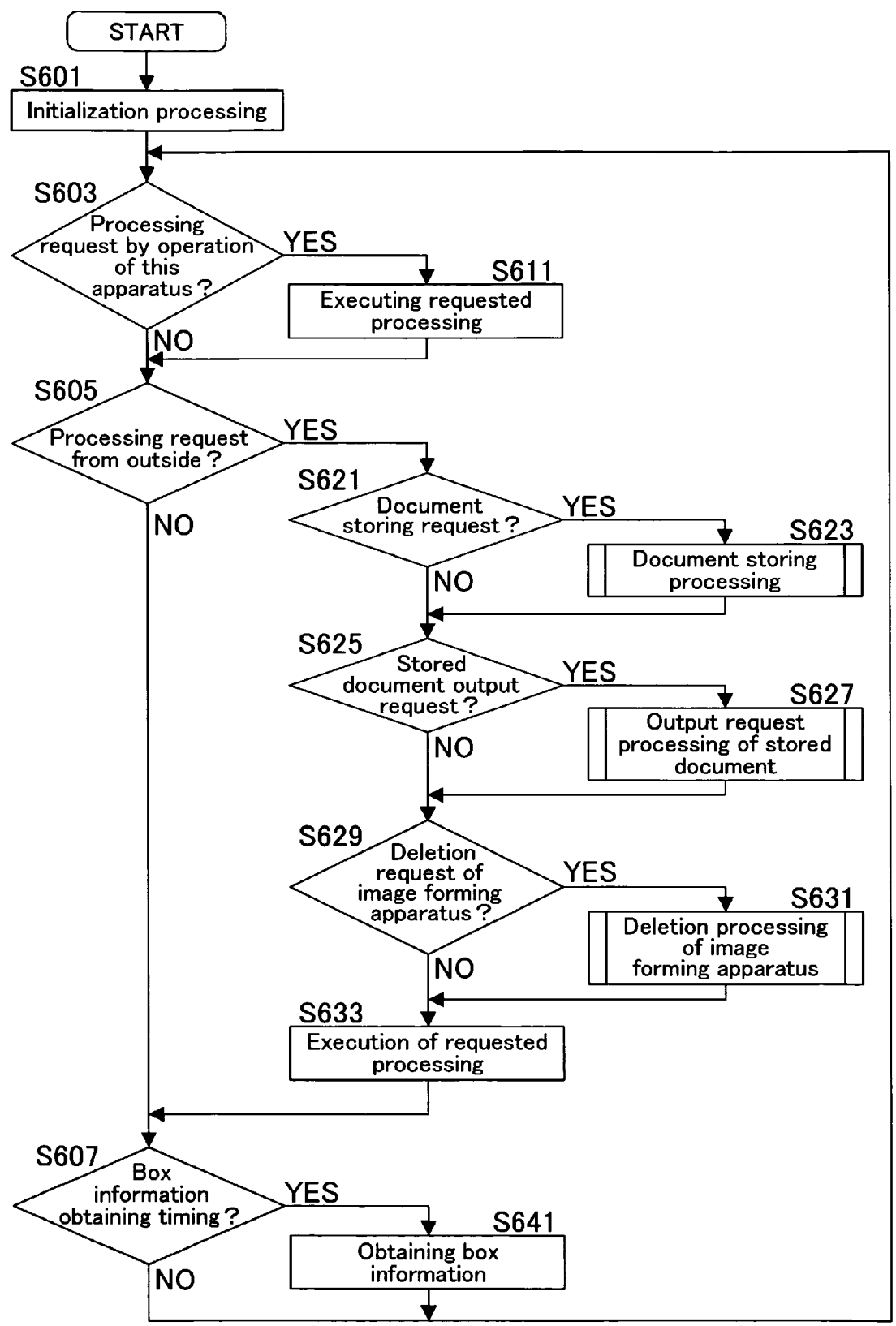
FIG. 7 is a flowchart showing an entire processing flow of the server apparatus.

Initially, the entire processing flow of the server apparatus 4 will be explained with reference to the flowchart shown in FIG. 7. This processing is performed by executing the program stored in the ROM 402 by the CPU 401

In the server apparatus 4, upon the power-on operation, processing is initiated. The CPU 401 initially executes initialization processing such as memory clearing and normal mode setting (Step S601).

After the completion of the initialization processing, the CPU 401 discriminates whether any processing request is made via the operations of the key board and/or the mouse of the server apparatus 4 (Step S603). If no processing request is made (NO at Step S603), the routine proceeds to Step S605.

If any processing request is made (YES at Step S603), the requested processing is executed (Step S611). The processing requests include registration processing of the virtual boxes 414, 415 . . . and registration processing of the image forming apparatuses 1-*x* (x:1-*n*). These two processing will be explained later.

Next, the server apparatus 4 discriminates whether any processing request (e.g., document print processing, various setting processing) is made by any external apparatus such as the terminal apparatus 2 via the network 3 (Step S605). If no processing request is made (NO at Step S605), the routine proceeds to Step S607.

In cases where any processing request is made by any external apparatus (YES at S605), if the request is a request of storing a document to a virtual box (YES at S621), the document storing processing is executed (Step S623). This document storing processing will be detailed later.

If the processing requested by the external apparatus is an output request of a document stored in a virtual box (YES at Step S625), the output request processing of the stored document is executed (Step S627). This output request processing of the stored document will be detailed later.

If the processing requested by the external apparatus is deletion processing of an image forming apparatus 1-*x* (x:1-*n*) (YES at Step S629), the deletion processing of the image forming apparatus is executed (Step S631). The deletion processing of an image forming apparatus will be detailed later.

If the processing requested by the external apparatus is the other processing other than the above, the requested processing is executed (Step S633). Here, the other processing includes, for example, processing for a document print request.

Upon completion of all of the processing requested by the external apparatus, the routine proceeds to Step S607.

Lastly, it is confirmed whether it is the timing of obtaining the box information (Step S607). The CPU 401 of the server apparatus 4 routinely obtains the information on the boxes 111, 112, 113 . . . from each of the image forming apparatuses 1-*x*(x:1-*n*) registered in the image forming apparatus registering portion 411. For example, it can be constituted to obtain the information at a predetermined time every day. If it is the timing of obtaining box information, the server apparatus 4 inquires each registered image forming apparatus 1-*x* (x:1-*n*) and obtains the box information (Step S641).

The information to be obtained includes the box number, the box name and the box free space of the boxes registered in each image forming apparatus 1-*x*(x:1-*n*). The free space of the box is a space obtained by subtracting the size of the stored document from the maximum size defined in each box. The box information obtained from each image forming apparatus 1-*x*(x:1-*n*) is stored in the box information registering portion 412 of the fixed storing device 410 of the server apparatus 4.

[1-1] Registration of Virtual Boxes

Next, the registration processing of virtual boxes (Step S611 in FIG. 7), one of the processing requested by the keyboard/mouse operations at the operation portion 430 of the server apparatus 4, will be explained.

In the fixed storing device 410 of the server apparatus 4, one or more virtual boxes 414, 415 . . . are registered. Each virtual box is uniquely identified by its virtual box number in the same manner as in the boxes 111, 112 . . . of each of the image forming apparatuses 1-*x*(x:1-*n*). In place of the virtual box numbers, a box name can be allotted to each virtual box for easy identification.

To each of the virtual boxes 414, 415 . . . , its box number and box name are allotted via the keyboard/mouse operations at the operation portion 430 of the server apparatus 4. Such box numbers and box names are stored in the fixed storing device 410 of the server apparatus 4.

The virtual boxes 414, 415 . . . can be deleted by the operations of the operation portion 430.

As for the registration and deletion of the virtual boxes 414, 415 . . . , other than a method in which the virtual boxes are deleted by the keyboard/mouse operations at the operation portion 430 of the server apparatus 4, it can be configured such that the server apparatus 4 has a Web server function so that an external apparatus such as the terminal apparatus 2 can access the Web server to register/delete the virtual boxes.

[1-2] Registration of Image Forming Apparatuses 1-*x*(x:1-*n*) to the Server Apparatus Next, the registration processing (Step S611 in FIG. 6) of the image forming apparatuses 1-*x* (x:1-*n*) each having a box function connected to the server apparatus 4 via the network 3 will be explained.

In the server apparatus 4, the image forming apparatuses 1-*x*(x:1-*n*) each having a box function connected to the server apparatus 4 via the network 3 are registered. Regarding the image forming apparatus to be registered, the apparatus name, the IP address, the color attribution (cooler apparatus or monochrome apparatus) and the productivity rate are inputted via the keyboard/mouse operations at the operation portion 430 of the server apparatus 4 and registered in the image forming apparatus registering portion 411 of the fixed storing device 410 as an image forming apparatus administration list. FIG. 12 shows an example of the image forming apparatus administration list.

The registered image forming apparatuses 1-*x*(x:1-*n*) can be deleted from the administration list via the keyboard/mouse operations.

As for the registration and deletion of the image forming apparatuses, other than a method in which the image forming apparatuses are deleted by the keyboard/mouse operations at the operation portion 430 of the server apparatus 4, it can be configured such that the server apparatus 4 has a Web server function so that an external apparatus such as a terminal apparatus 2 can access the Web server to register/delete the image forming apparatuses.

[1-3] Document Storing Processing

Figure 8:
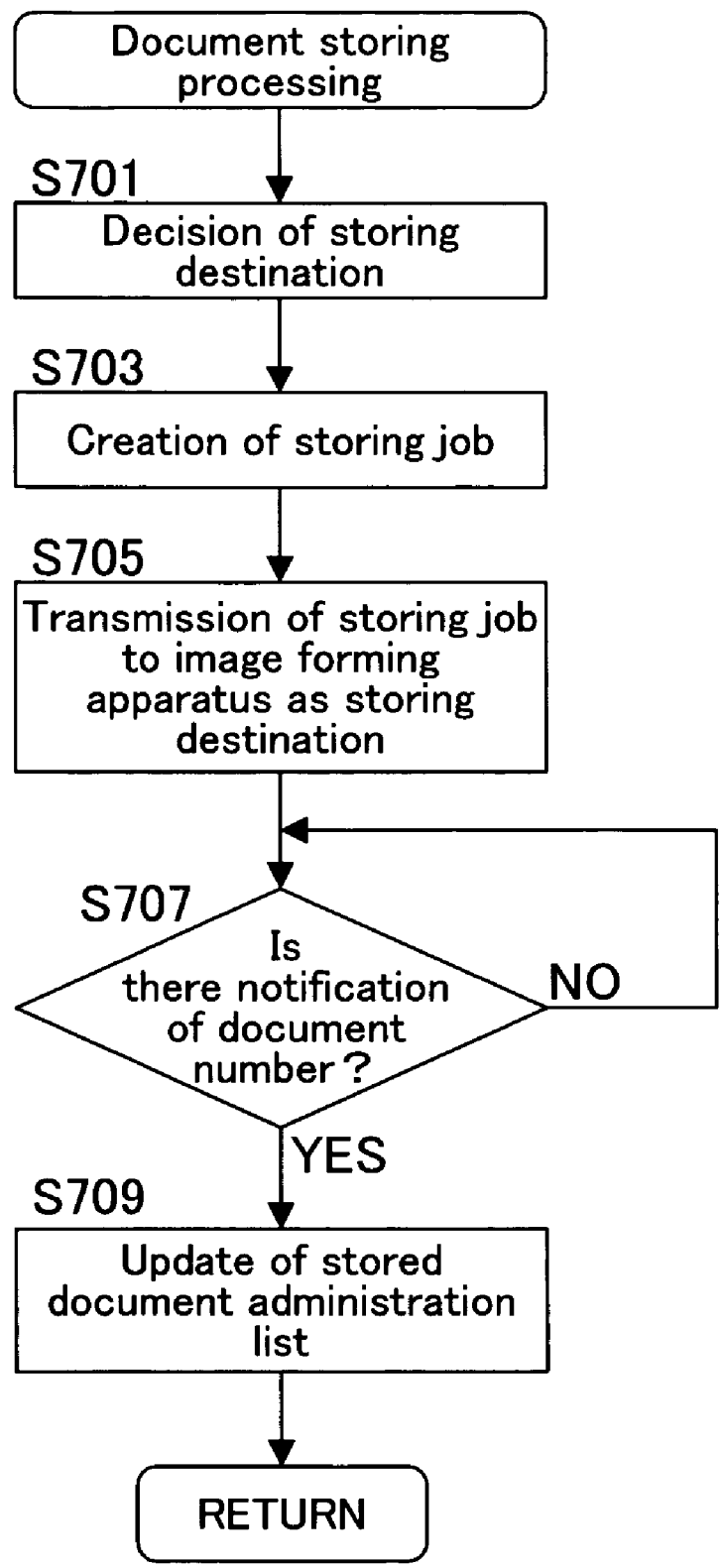
FIG. 8 is a flowchart showing the document storing processing to be executed at Step S623 in the flowchart shown in FIG. 7.

Next, the document storing processing at Step S623 in FIG. 7 will be explained with reference to the flowchart shown in FIG. 8.

In the case of storing a document in one of the virtual boxes 414, 415 . . . , a document to be stored is transmitted to the server apparatus 4 from the terminal apparatus 2 with one of the virtual boxes as a storing destination designated. At this time, the terminal apparatus 2 specifies the parameters shown below to the server apparatus 4.

STOREINBOX=ON
    BOXTOSTORE=123

[STOREINBOX=ON] denotes that storing a document in the virtual box 414 (415 . . . ) is initiated, and [BOXTOSTORE=123] denotes that the box number of the virtual box as a storing destination is 123.

Receiving a document storing request from the terminal apparatus 2, the CPU 401 of the server apparatus 4 initially decides a storing destination for actually storing the document (Step S701). This storing destination deciding processing will be detailed later.

Next, the CPU 401 of the server apparatus 4 creates a storing job to be transmitted to the image forming apparatus decided as a storing destination (Step S703). The storing job to be created is a print data with the following PJL designation at the head thereof.

%-12345X@PJL
    @PJL SET STOREINBOX=ON
    @PJL SET BOXTOSTORE=1135

[@PJL SET STOREINBOX=ON] denotes that the print data is a storing job, [@PJL SET BOXTOSTORE=1135] denotes the box number of the box as a storing destination. This box number is not a box number of the virtual box 414 (415 . . . ) in the server apparatus 4 but a box number of a box in the image forming apparatus decided as a storing destination.

Next, the print data of the created storing job is transmitted to the image forming apparatus as a storing destination decided at Step S701 (Step S705). In the image forming apparatus which received the storing job, the document is stored in the designated box 111 (112, 113 . . . ). The processing to be performed by the image forming apparatus will be explained later.

Thereafter, the CPU 401 of the server apparatus 4 stands by until the document number allotted to the document stored in the image forming apparatus is notified from the image forming apparatus (Step S707). Receiving the notice from the image forming apparatus (YES at Step S707), the CPU 401 registers the document number in the storing document administration list of the document information registering portion 413 (Step S709), and the processing terminates.

FIG. 9 shows an example of a storing document administration list. In this storing document administration list, the following information is registered for each storing document.

1) Virtual Box Number
The number of a virtual box for storing a document
2) IP Address of an Image Forming Apparatus
The IP address of an image forming apparatus actually storing the document
3) Box Number
The box number of the box of the image forming apparatus actually storing the document
4) Document Number
The document number of the stored document of the image forming apparatus actually storing the documents
5) Document Name
The file name of a storing document received from the terminal apparatus 2

Decision of the Storing Destination

Next, the processing for deciding the actual storing destination of the document stored in the virtual box (Step S701 in FIG. 8) will be explained.

As a method of deciding a storing destination, there are at least four types of methods, i.e., the following 1) to 4) methods. The server apparatus 4 is configured such that any one of the methods can be selected by the keyboard/mouse operations and that the selected method is stored in the fixed storing device 410. At the time of deciding the storing destination, a method selected at that time is used.

1) the User Name of the User Who Made a Storing Request and the Name of the Box

The box having a user name and a box name which are the same as the same user name and box name to which a storing request is made is determined as the actual storing destination. The user name of the user who made the storing request is notified from the terminal apparatus 2 to the server apparatus 4 with the parameters as follows:
USERNAME="kitajima"
STOREINBOX=ON
BOXTOSTORE=123
The user name of the user who made the storing request is notified by the parameter of "USERNAME="kitajima."

2) The Size of a Document to be Stored and the Free Space of Each Box of Each Image Forming Apparatus Among boxes in which the user name of the user and the box name to which the storing request was made coincide, a box having a sufficient free space for storing the document to be stored is decided as the actual storing destination. For example, in cases where the size of the document to be stored is 500 KB (kilobyte), a box having a free space of 500 KB or more among the boxes in which the user name of the user and the box name to which the storing request was made coincide is nominated as a storing destination. As explained at Step S607 and Step S641 in FIG. 7, the free space of each box is routinely obtained from each image forming apparatus 1-$x$ ($x$:1-$n$) and stored in the box information registering portion 412 of the fixed storing device 410 of the server apparatus 4.

3) The Size of the Document to be Stored and the Productivity Rate of Each Image Forming Apparatus One of the boxes of the image forming apparatus having a productivity rate falling within a determined range as a result of comparing the size of the document to be stored with the following Table 1 and having a box name which is the user name who made the storing request is decided as a storing destination.

The following table is an example, and therefore it is possible to use another table in which a document is further subdivided in size or a document and/or productivity rate range are different from those shown in the following table.

TABLE 1

| Document size | Range of productivity rate | |
|---|---|---|
| | Lower limit | Upper limit |
| -300K | — | 25 PPM |
| 300K–1M | 26 PPM | 45 PPM |
| 1M- | 46 PPM | — |

As explained above, the productivity rate of the image forming apparatus 1-$x$ ($x$:1-$n$) is inputted at the time of registering the image forming apparatus and stored in the image forming apparatus registering portion 411 of the fixed storing device 410 of the server apparatus 4.

4) Color Attribution of a Document and Color Attribution of an Image Forming Apparatus One of the boxes of the image forming apparatus having the box name which is the user name of the user who made a storing request and having the color attribution which coincides with the color attribution of the document is decided as a storing destination.

For example, in cases where a document to be stored is a color document, a box of a color apparatus is selected as the storing destination. On the other hand, in cases where a document to be stored is a monochrome document, a box of a monochrome apparatus is selected as the storing destination. As already explained, the color attribution of each image forming apparatus 1-$x$($x$:1-$n$) is also inputted and stored in the image forming apparatus registering portion 411 of the fixed storing device 410 of the server apparatus 4 at the time of registering image forming apparatuses.

In any one of the aforementioned cases 1) to 4), in cases where a plurality of boxes are nominated as storing destinations, a box of the image forming apparatus lastly registered in the image forming apparatus registering portion 411 of the server apparatus 4 is selected as a storing destination.

Furthermore, in the case of the aforementioned cases 3) and 4), if any one of the boxes 111, 112, 113 . . . having a box name which coincides with the user name of the user who performed the storing processing is not registered in the image forming apparatus 1-$x$ ($x$:1-$n$) decided as a storing destination, the image forming apparatus registers a specified box and stores the document therein. At this time, the box to be registered in the image forming apparatus is set as follows:

Box number: the number next to the largest number among the box numbers of the boxes already registered in the image forming apparatus
Box name: the user name of the user who made the storing request
Box type: private box
Box password: the user name of the user who made the storing request

[1-5] Output Request Processing of a Stored Document

Figure 10:
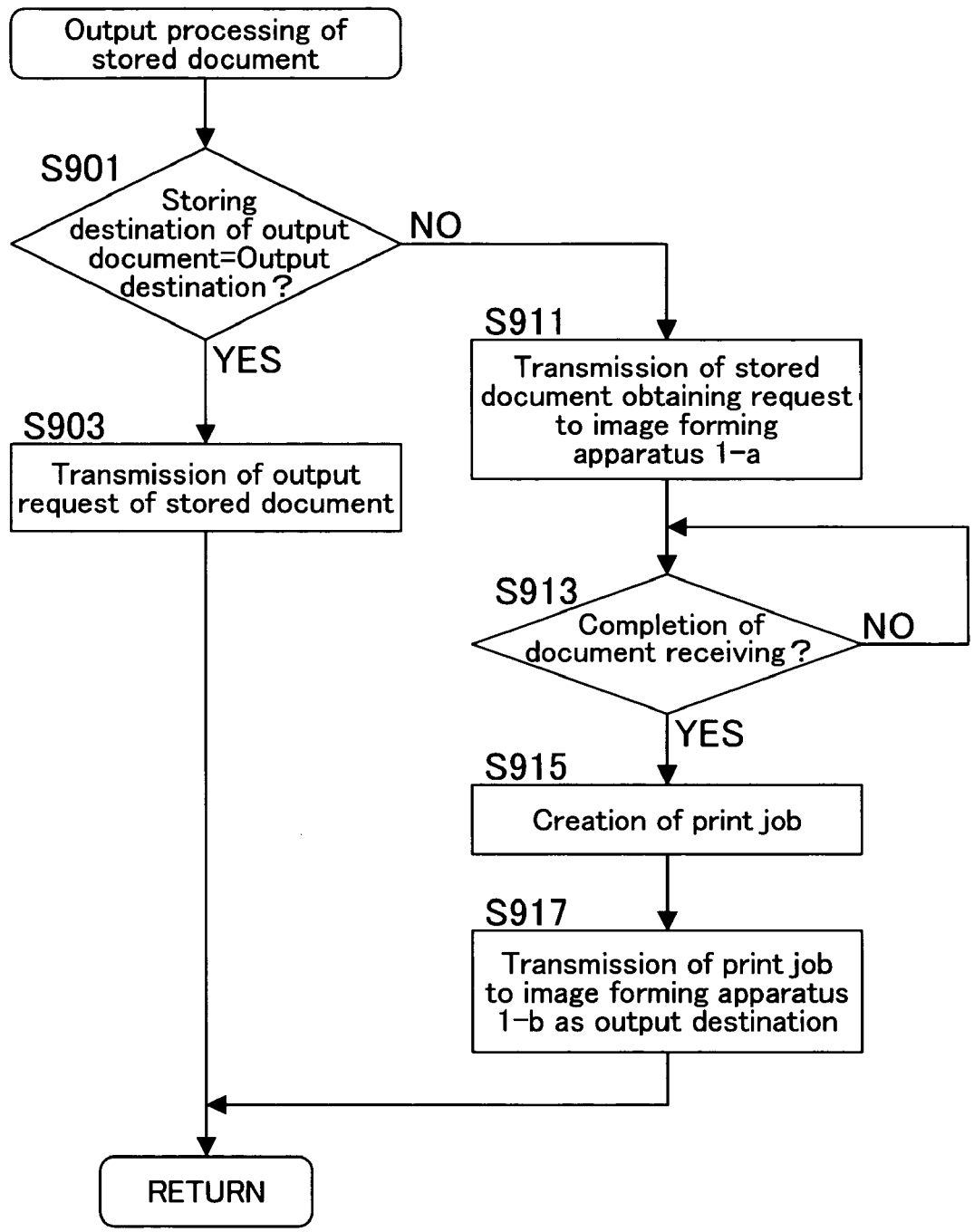
FIG. 10 is a flowchart showing output processing of a stored document to be executed at Step S627 in the flowchart shown in FIG. 7.

Next, Step S627 in FIG. 7, i.e., output request processing of a stored document, will be detailed with reference to the flowchart shown in FIG. 10.

The terminal apparatus 2 obtains a list of the virtual boxes (hereinafter referred to as "virtual box list") from the server apparatus 4 and displays the list on its monitor. Furthermore, the terminal apparatus 2 obtains a list of all of the documents stored in the selected virtual box (hereinafter referred to as "stored document list") from the virtual box list and displays the list on its monitor. A user operating the terminal apparatus 2 selects the document to be outputted from the stored document list.

As a result of the aforementioned user operations, the terminal apparatus 2 transmits an output request of the stored document including the below-listed parameter specification to the server apparatus 4.

OUTPUTDOCINBOX=PRINT
DOCTOOUTPUT="123,1001"
DEVICETOOUTPUT="10.192.168.1"

[OUTPUTDOCINBOX=PRINT] denotes printing of the stored document. [DOCTOOUTPUT="123,1001"] denotes a document to be outputted in the form of ["box number, document number"]. The box number specified here is the box number of the virtual box 414 (415 . . . ). [DEVICETOOUTPUT="10.192.168.1"] denotes an IP address of the image forming apparatus 1-x(x:1-n) as an output destination.

In the case of outputting the document to be outputted to an external apparatus, parameters will be specified as follows:

OUTPUTDOCINBOX=SEND
DOCTOOUTPUT="123,1001."
DEVICETOOUTPUT="10.192.168.1"
ADDRTOSENDDOC="tanaka@abc.com"

To the [OUTPUTDOCINBOX] parameter, [SEND] is specified. To the [ADDRTOSENDDOC] parameter, an E-mail address as a transmission destination is specified. The other parameters are the same as those in the case of printing the document.

The CPU 401 of the server 4 which received the output request of the stored document from the terminal apparatus 4 receives this output request, and initially discriminates whether the image forming apparatus in which the document corresponding to the output request is stored (hereinafter "image forming apparatus 1-a") coincides with the image forming apparatus as an output destination (hereinafter "image forming apparatus 1-b") (Step S901). This is performed by referring the stored document administration list stored in the document information registering portion 413 of the fixed storing portion 410, obtaining the IP address of the image forming apparatus in which the document of the specified document number stored in the specified virtual box is actually stored, and then comparing the IP address with the IP address of the image forming apparatus as an output destination specified by the [DEVICETOOUTPUT] parameter.

If the image forming apparatus 1-a and the image forming apparatus 1-b are the same image forming apparatus (YES at Step S901), an output request of the stored document is transmitted to the image forming apparatus (Step S903). At this time, the CPU 401 of the server apparatus 4 transmits the following print data to the image forming apparatus.

%-12345X@PJL
@PJL SET OUTPUTDOCINBOX=PRINT
@PJL SET DOCTOOUTPUT="1134,1001"
%-12345X

The printing of the stored document is instructed by the [@PJL SET OUTPUTDOCINBOX=PRINT]. The stored document to be outputted is specified by the [@PJL SET DOCTOOUTPUT="1134,1001"] in the form of ["box number, document number"]. The box number to be set here is not the box number of the virtual box 414 (415 . . . ) of the server apparatus 4 but the box number of the image forming apparatus in which the document to be outputted is actually stored.

In cases where the document is to be transmitted to an external apparatus, the following data is transmitted.

%-12345X@PJL
@PJL SET OUTPUTDOCINBOX=SEND
@PJL SET DOCTOOUTPUT="1134,1001"
@PJL SET ADDRTOSENDDOC="tanaka@abc.com"
%-12345X On the other hand, in cases where the image forming apparatus 1-a and the image forming apparatus 1-b are not the same image forming apparatus (NO at Step S911), an obtain request of the stored document is transmitted to the image forming apparatus 1-a (STEP S911). At this time, the CPU 401 of the server apparatus 4 transmits the following print data to the image forming apparatus.

%-12345X@PJL
@PJL SET GETDOCINBOX=ON
@PJL SET DOCTOGET="1134,1001"
%-12345X

An obtain request of the stored document is notified by the [@PJL SET GETDOCINBOX=ON]. The document which a user wishes to obtain is specified by the [@PJL SET DOCTOGET="1134,1001"] in the form of ["box number, document number"]. The box number to be set here is not the box number of the virtual box 414 (415 . . . ) of the server apparatus 4 but the box number of the image forming apparatus in which the document to be outputted is actually stored.

Thereafter, the CPU 401 of the server apparatus 4 stands by until completion of receiving the stored document requested to obtain. Upon completion of receiving the document (YES at Step S913), a print job including print data to be transmitted to the image forming apparatus 1-b is created (Step S915). This print data is print data of a normal print job which instructs printing of the stored document obtained from the image forming apparatus 1-a.

The created print job is transmitted to the image forming apparatus 1-b (Step S917). Then, this processing terminates.

[1-6] Deletion Processing of an Image Forming Apparatus

Figure 11:
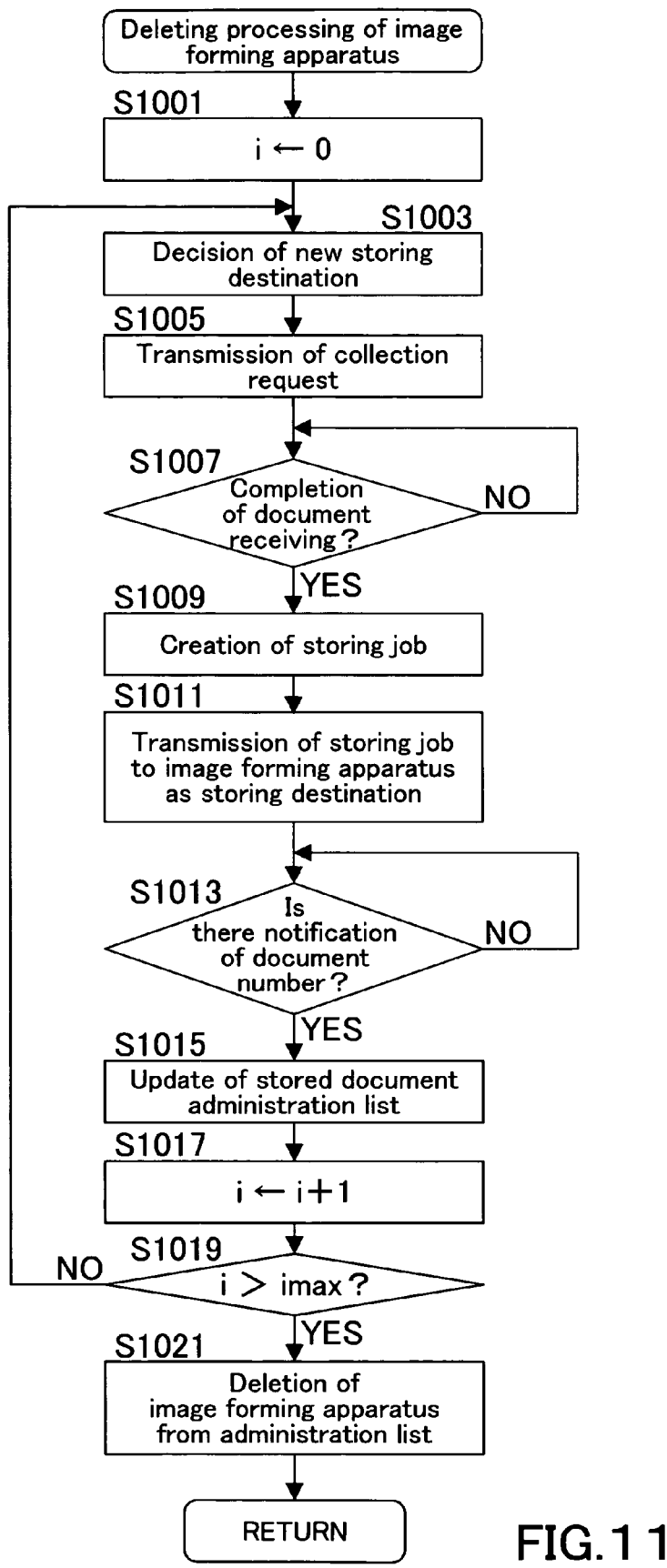
FIG. 11 is a flowchart showing deleting processing of an image forming apparatus to be executed at Step S631 in the flowchart shown in FIG. 7.

Deletion processing of an image forming apparatus, i.e., Step S631 in FIG. 7, will be detailed with reference to the flowchart shown in FIG. 11.

The terminal apparatus 2 obtains a list of image forming apparatuses registered in the image forming apparatuses registering portion 411 of the fixed storing device 410 of the server apparatus 4 (hereinafter referred to as "image forming apparatus list") from the server apparatus 4, and displays on its monitor. The user operating the terminal apparatus 2 selects an image forming apparatus to be deleted from the image forming apparatus list.

As a result of the aforementioned user operations, the terminal apparatus 2 transmits a deletion request of the image forming apparatus in which the IP address of the image forming apparatus to be deleted (hereinafter, "image forming apparatus 1-a") is specified by a parameter as shown below.

DEVICETODELETE="10.192.168.1."

Upon receipt of the aforementioned request, the CPU 401 of the server apparatus 4 initially executes the following processing about each of the documents stored in the image forming apparatus 1-a.

Initially, new storing destinations of the stored documents i (i=1–the number of documents stored in the image forming apparatus 1-a) are decided (Step S1003). The processing for deciding new storing destinations is the same as the previously explained document storing processing. Accordingly, the duplicate explanation will be omitted here. However, it should be noted that in this processing the storing destinations are decided by excluding the image forming apparatus 1-*a* from new storing destination nominations.

When new storing destinations are decided, collection requests of the stored documents i are transmitted to the image forming apparatus 1-*a* (Step S1005). At this time, the CPU 401 of the server apparatus 4 transmits the following print data to the image forming apparatus 1-*a*.

%-12345X@PJL
@PJL SET COLLECTDOC=ON
@PJL SET DOCTOCOLLECT="1134,1001"
%-12345X

The collection of the stored document is requested by the [@PJL SET COLLECTDOC=ON], and the collecting documents are specified by the [@PJL SET DOCTOCOLLECT="1134,1001"] in the format of "box number, document number." The box number to be set here is not the box number of the virtual box 414, 415 . . . of the server apparatus 4 but the box number of the image forming apparatus in which the document to be outputted is actually stored.

Thereafter, the CPU 401 of the server apparatus 4 stands by until completion of receiving the documents to which collection requests were made. Upon completion of receiving the documents (YES at Step S1007), the CPU 401 creates storing jobs for transmitting the received documents to image forming apparatuses 1-*b* as new storing destinations (hereinafter, image forming apparatus 1-*b*) (Step S1009). The processing of creating a storing job is the same as the processing of creating the storing job explained in the document storing processing, and therefore duplicate explanation will be omitted.

When print data of the storing job is created, the created print data is transmitted to the image forming apparatus 1-*b* (Step S1011).

Thereafter, the server apparatus 4 stands by until the document number allotted to the document stored in the image forming apparatus 1-*b* is notified from the image forming apparatus 1-*b*. Upon receipt of the notification (YES at Step S1013), the server apparatus 4 updates the storing document administration list (Step S1015). Concretely, the values in the "IP address of the image forming apparatus" section and the "box number" section are updated into the IP address and the box number of the box as a storing destination of the image forming apparatus 1-*b*, respectively. The value in the "document number" section is updated into the document number notified from the image forming apparatus 1-*b*. The value of "document number" section is updated into the document number notified from the image forming apparatus 1-*b*.

When the aforementioned processing of all of the documents stored in the image forming apparatus 1-*a* has completed (YES at Step S1019), the image forming apparatus 1-*a* is deleted from the image forming apparatus administration list (Step S1021). Then, this processing terminates.

[2] Entire Processing of an Image Forming Apparatus 1-*x* (x:1-*n*)

Figure 13:
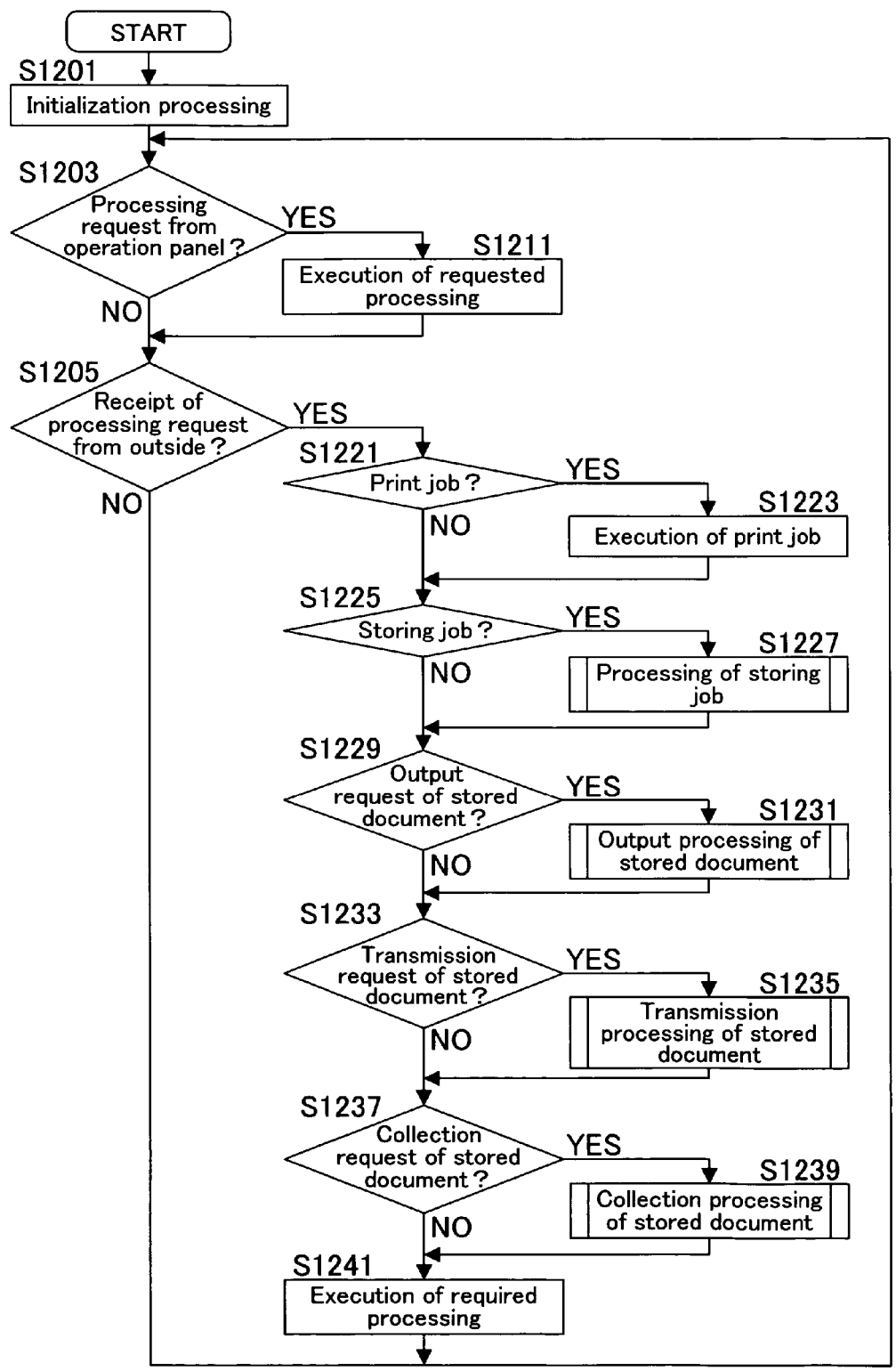
FIG. 13 is a flowchart showing an entire processing flow of an image forming apparatus.

Next, the entire processing flow of an image forming apparatus 1-*x* (x:1-*n*) will be explained with reference to the flowchart shown in FIG. 13. This processing is performed by the CPU 101 executing the program stored in the ROM 102.

Each image forming apparatus 1-*x*(x:1-*n*) executes the same processing. Therefore, the following explanation is directed to processing performed by one image forming apparatus 1-1 for the purpose of convenience.

The CPU 101 of the image forming apparatus 1-1 initiates the processing upon application of power. Initially, initialization processing such as memory clearing and normal mode setting is executed (Step S1201).

Upon completion of the initialization processing, it is confirmed whether any processing request (e.g., original document scanning and copying processing, various setting processing) was made by a user via operations of the key switches of the operation panel 130 and on the display portion of the image forming apparatus 1-1 (Step S1203). If there is no processing request (NO at Step S1203), the routine proceeds to Step S1205.

If there is any processing request (YES at Step S1203), the requested processing is executed (Step S1211). Examples of another processing include scanning of an original document and copying processing, and box registration processing.

Upon completion of all of the processing requested by a user, the routine proceeds to Step S1205.

Next, it is confirmed whether any processing request (e.g., document print processing, various setting processing) is made from an external apparatus such as the terminal apparatus 2 via the network 3 (Step S1205). If there is no processing request from any external processing (NO at Step S1205), the routine returns to Step S1203, and the aforementioned processing will be repeated.

If any processing request is made from any external apparatus (YES at S1205) and the request is a print job (YES at Step S1221), the requested print job is executed (Step S1223).

If the processing requested by any external apparatus is a storing job for storing a document in a box (YES at Step S1225), the processing of the storing job is executed (Step S1227). The processing of the stored job will be detailed later.

If the processing requested by any external apparatus is an output request of a document already stored in a box (YES at Step S1229), the output processing of the stored document is executed (Step S1231). The output processing of the stored document will be detailed later.

If the processing requested by any external apparatus is a transmission processing of a stored document (YES at Step S1233), the transmission processing of the stored document is executed (Step S1235). The transmission processing of the stored document will be detailed later.

If the processing requested by any external apparatus is a collection processing of a stored document (YES at S1237), the collection processing of the stored document is executed (Step S1239). The collection processing of the stored document will be detailed later.

If the processing requested by any external apparatus is the other processing other than the aforementioned processing, the requested processing is executed (Step S1241). Examples of the other processing include processing of changing various settings stored in the NV-RAM 104.

Upon completion of all of the processing requested by any external apparatus, the routine returns to Step S1203 and the aforementioned processing is repeated.

[2-1] Processing of a Storing Job

Figure 14:
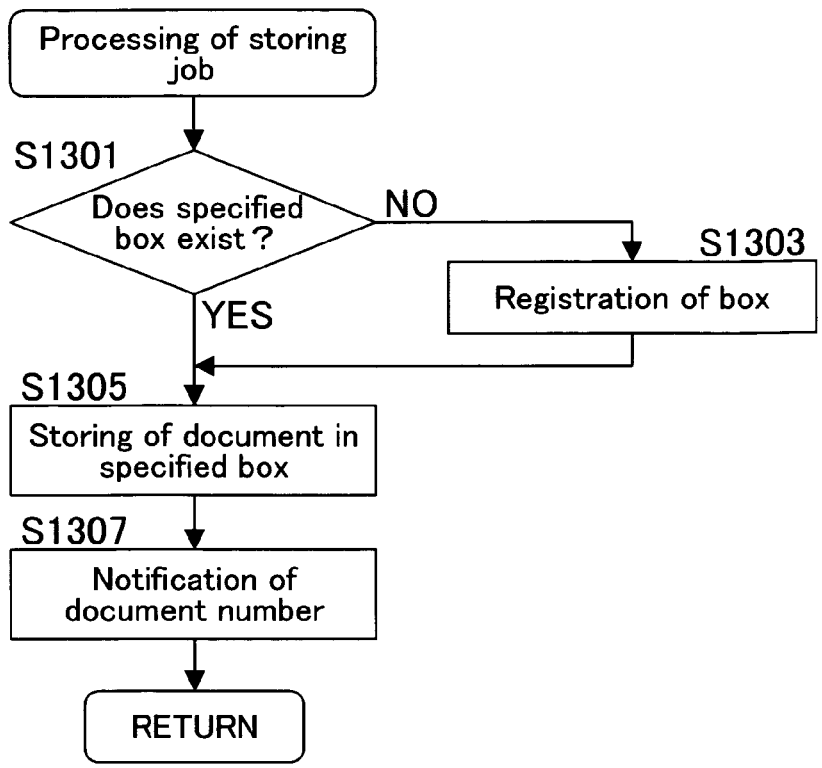
FIG. 14 is a flowchart showing stored job processing to be executed at Step S1227 in the flowchart shown in FIG. 13.

The Step S1227 in FIG. 13, i.e., the processing of the storing job, will be explained with reference to the flowchart shown in FIG. 14.

The image forming apparatus 1-1 which received the storing job initially confirms whether the specified box is registered in itself (Step S1301). If the specified box is not registered in the image forming apparatus (NO at Step S1301), the specified box is registered (Step S1303), and the routine proceeds to Step S1305. As mentioned above, in this embodiment, if a box specified as a storing destination does not exist in the image forming apparatus, a corresponding box is created. Therefore, the document can be assuredly stored in the decided storing destination.

At Step S1305, the document is stored in the specified box. At this time, the image forming apparatus 1-1 numbers a document identification number to the stored document. This document identification number is a number next to the sequence number administered by the image forming apparatus 1-1, i.e., the largest number among the document numbers of documents already stored in the image forming apparatus.

Thereafter, the image forming apparatus 1-1 notifies the document identification number of the stored document of the server apparatus 4 (Step S1307), and this processing terminates.

[2-2] Output Processing of the Stored Document

Figure 15:
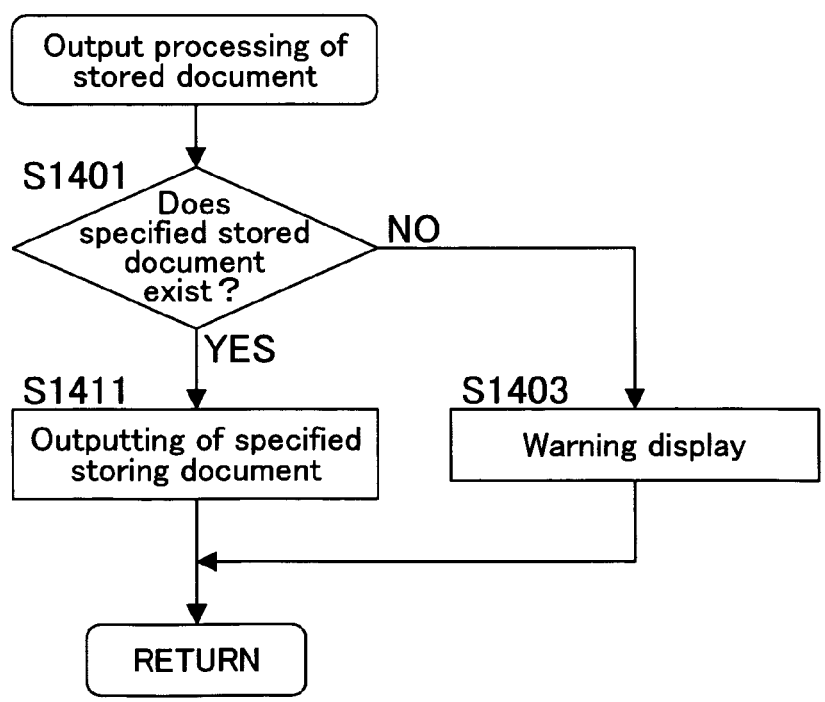
FIG. 15 is a flowchart showing output processing of a stored document to be executed at Step 1231 in the flowchart shown in FIG. 13.

The Step S1231 in FIG. 13, i.e., output processing of a stored document, will be explained with reference to the flowchart shown in FIG. 15.

The CPU 101 of the image forming apparatus 1-1 which received an output request of a stored document initially discriminates whether the specified document exists as a storing document (Step S1401). If there is no specified document (NO at Step S1401), the fact is displayed on the operation panel 130 (Step S1403), and this processing terminates.

If there is the specified document (YES at Step S1401), the specified document is outputted (Step S1411), and this processing terminates. As explained in the output request processing of the stored document in the server apparatus 4, in cases where [PRINT] is specified with [OUTPUTDOCIN-BOX] variables of PJL, the specified stored document is printed. On the other hand, in cases where [SEND] is specified with [OUTPUTDOCINBOX] variables of PJL, the specified stored document is E-mailed to the destination specified by [ADDRTOSENDDOC] variables of PJL.

[2-3] Transmission Processing of a Stored Document

Figure 16:
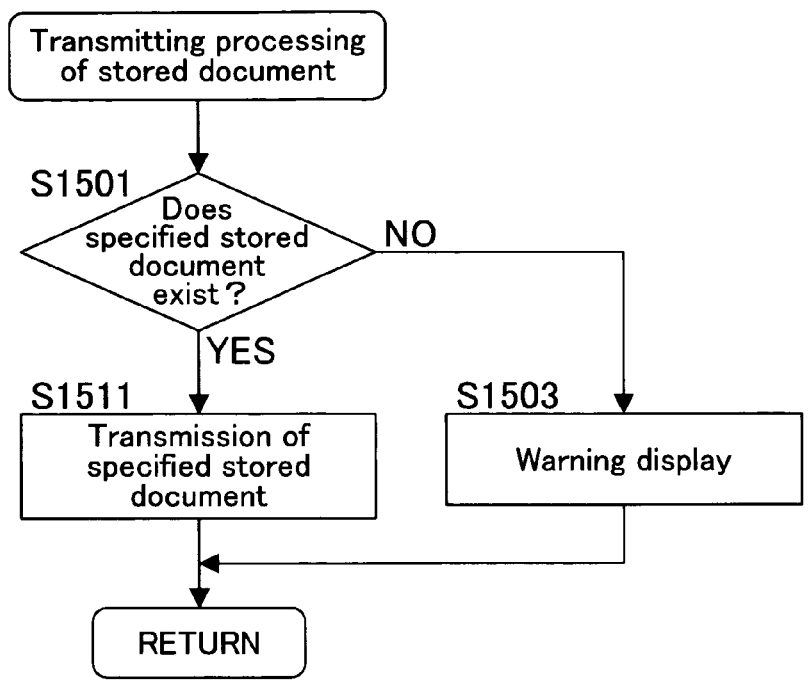
FIG. 16 is a flowchart showing transmit processing of a stored document to be executed at Step 1235 in the flowchart shown in FIG. 13.

The Step S1235 in FIG. 13, i.e., the transmission processing of a stored document, will be explained with reference to a flowchart shown in FIG. 16.

The CPU 101 of the image forming apparatus 1-1 which received a transmission request of a stored document initially discriminates whether the specified document exists as a storing document (Step S1501). If there is no specified document (NO at Step S1501), the fact is displayed on the operation panel 130 (Step S1503), and this processing terminates.

If the specified document exists (YES at Step S1501), the specified document is transmitted to the server apparatus 4 (Step S1511). In this transmission processing, the specified document remains in the box without being deleted from the box.

[2-4] Collection Processing of a Stored Document

Figure 17:
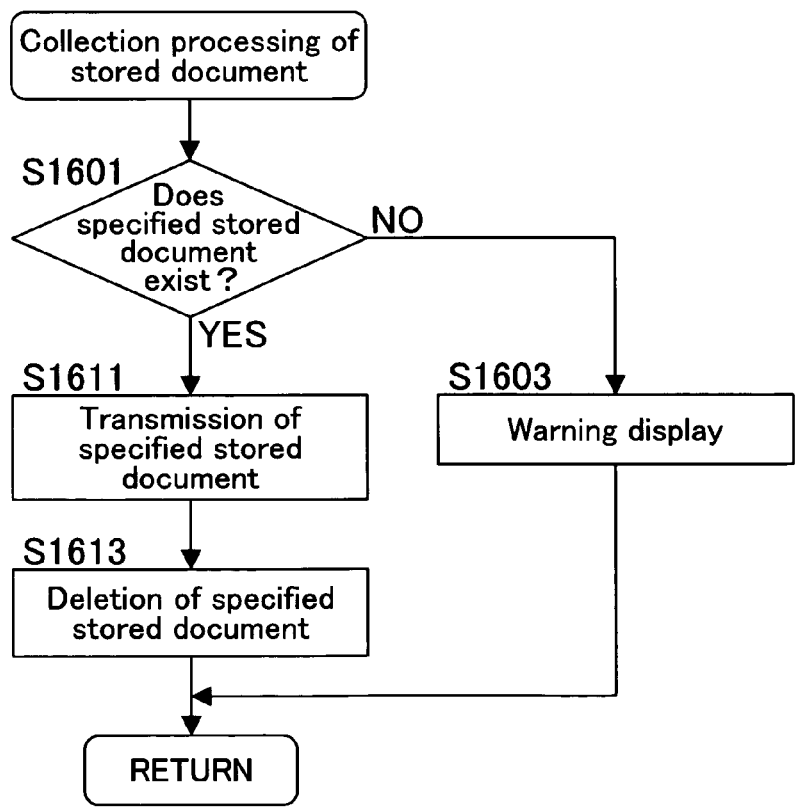
FIG. 17 is a flowchart showing collection processing of a stored document to be executed at Step 1239 in the flowchart shown in FIG. 13.

The step S1239 in FIG. 13, i.e., the collection processing of a stored document, will be explained with reference to the flowchart shown in FIG. 17.

The CPU 101 of the image forming apparatus 1-1 which received a collection request of a stored document initially discriminates whether the specified document exists as a storing document (Step S1601). If there is no specified document (NO at Step S1601), the fact is displayed on the operation panel 130 (Step S1603), and this processing terminates.

If the specified document exists (YES at Step S1601), the specified document is transmitted to the server apparatus 4 (Step S1611). Thereafter, the specified document is deleted from the box (Step S1613), and this processing terminates.

As will be understood from the above explanation, in this embodiment, when a virtual box 414 (415 . . . ) is registered and a document is stored in this virtual box, the storing destination, i.e., to which box 111 (112, 113 . . . ) of which image forming apparatus 1-$x$ (x:1-$n$) the document is to be stored, is automatically decided based on any one or more of information including information on the document to be stored, information on the image forming apparatus 1-$x$ (x:1-$n$) registered in the image forming apparatus registering portion 411 and information on boxes obtained by the CPU 401 and registered in the box information registering portion 412. And, the document is transmitted to the image forming apparatus as a storing destination, and stored in the box of the storing destination.

Accordingly, a user can be released from botheration of selecting one of boxes for storing a document among a plurality of document storing apparatuses or botheration of memorizing that a document was stored in which box of which document storing apparatus, resulting in a user-friendly system in which a document can be stored without considering each document storing apparatus.

Furthermore, at the time of outputting a stored document, if an outputting image forming apparatus selected based on a user instruction is an image forming apparatus actually storing the document, the server apparatus 4 instructs the image forming apparatus to output the document. To the contrary, the selected outputting image forming apparatus differs from the image forming apparatus actually storing the document, the server apparatus 4 obtains the document from an image forming apparatus storing the document, and the obtained document is transmitted to the selected outputting image forming apparatus and outputted.

Thus, when an output request is made against the server apparatus 4, the document is automatically outputted from the specified image forming apparatus. Accordingly, a user is not required to perform an output operation against each image forming apparatus.

Furthermore, when any image forming apparatus 1-$x$ (x:1-$n$) registered in the server apparatus 4 is deleted, the documents stored in the image forming apparatus are obtained by the server apparatus 4. The obtained documents are transmitted to another image forming apparatus as a new storing destination and stored therein. Accordingly, in cases where an image forming apparatus is discarded or replaced with a new one, it is only required to delete the image forming apparatus registered in the server apparatus 4. The documents stored in the image forming apparatus to be discarded are automatically moved to and stored in a newly decided appropriate storing destination(s). Therefore, a user is not required to consider a new storing destination(s) of the documents and move the documents to a new storing destination(s), resulting in enhanced usability.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. For example, although the document storing request and the output request is made from the terminal apparatus 2 in the embodiment, they may be made by using the operation portion 430 of the server apparatus 4.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A document administration system, comprising:
a plurality of document storing apparatuses; and
a server apparatus connected the plurality of document storing apparatuses via a network,
wherein each of the plurality of document storing apparatuses is controlled by a processor and includes:
a plurality of boxes for storing various information in a sorted manner; and
a document storing device for making the document storing apparatus store a document in one of the boxes,
wherein the server apparatus is controlled by another processor and includes:
a document storing apparatus registering portion for registering information on each of the document storing apparatuses;
a box information obtaining portion for obtaining information on the boxes from each of the document storing apparatuses;
a storing request receiving portion for receiving a storing request of the document;
a storing destination deciding portion for automatically deciding which one of the plurality of document storing apparatuses and which one of the plurality of boxes thereof for actually storing the document, based on any one or more of information including information on the document corresponding to the storing request received by the storing request receiving portion, information on the document storing apparatuses registered in the document storing apparatus registering portion, and information on the boxes obtained by the box information obtaining portion; and
a controller for transmitting the document to the one of the document storing apparatuses having the one of the boxes selected by the storing destination deciding portion and making the one document storing apparatus store the document in the one of the boxes.

2. The document administration system as recited in claim 1, wherein the storing destination deciding portion of the server apparatus decides the one of the document storing apparatuses and the one of the boxes thereof as a storing destination based on a user name of a user who made the storing request and a box name specified by the user.

3. The document administration system as recited in claim 1, wherein the storing destination deciding portion of the server apparatus decides the one of the document storing apparatuses and the one of the boxes thereof as a storing destination based on a size of the document to be stored and a free space of each of the boxes of each of the document storing apparatuses.

4. The document administration system as recited in claim 1, wherein the storing destination deciding portion of the server apparatus decides the one of the document storing apparatuses and the one of the boxes thereof as a storing destination based on a size of a document to be stored and a productivity rate of each of the document storing apparatuses.

5. The document administration system as recited in claim 1, wherein each of the document storing apparatuses is an image forming apparatus, and wherein the storing destination deciding portion of the server apparatus decides the one of the document storing apparatuses as a storing destination, based on a document color attribution showing whether the document to be stored is a monochrome document or a color document and an apparatus color attribution showing whether each of the document storing apparatuses is a monochrome apparatus or a color apparatus.

6. The document administration system as recited in claim 1, wherein the controller of the server apparatus creates a box corresponding to the one of the boxes decided by the storing destination deciding portion in the one of the document storing apparatuses decided by the storing destination deciding portion when the one of the boxes decided by the storing destination deciding portion does not exist in the one of the document storing apparatuses decided by the storing destination deciding portion.

7. The document administration system as recited in claim 1, wherein the one document storing apparatus storing the document is not the document storing apparatus, from among the plurality of document storing apparatuses, for outputting the document.

8. A document administering apparatus controlled by a processor and connected to a plurality of document storing apparatuses each having boxes for storing various information in a sorted manner via a network, the document administering apparatus comprising:
a document storing apparatus registering portion for registering information on each of the document storing apparatuses;
a box information obtaining portion for obtaining information on the boxes from each of the document storing apparatuses;
a storing request receiving portion for receiving a storing request of a document;
a storing destination deciding portion for automatically deciding which one of the plurality of document storing apparatuses and which one of the plurality of boxes thereof for actually storing the document, based on any one or more of information including information on the document corresponding to the storing request received by the storing request receiving portion, information on the document storing apparatuses registered in the document storing apparatus registering portion, and information on the boxes obtained by the box information obtaining portion; and a controller for transmitting the document to the one of the document storing apparatuses having a box decided by the storing destination deciding portion and making the one document storing apparatus store the document.

9. The document administering apparatus as recited in claim 8, wherein the storing destination deciding portion decides the one of the document storing apparatuses and the one of the boxes thereof as a storing destination, based on a user name of a user who made the storing request and a box name specified by the user.

10. The document administering apparatus as recited in claim 8, wherein the storing destination deciding portion decides the one of the document storing apparatuses and the one of the boxes thereof as a storing destination, based on a size of the document to be stored and a free space of the one of the boxes of each of the document storing apparatuses.

11. The document administering apparatus as recited in claim 8, wherein the storing destination deciding portion decides the one of the document storing apparatuses and the one of the box thereof as a storing destination, based on a size of the document to be stored and a productivity rate of each of the document storing apparatuses.

12. The document administering apparatus as recited in claim 8,
wherein each of the document storing apparatuses is an image forming apparatus, and
wherein the storing destination deciding portion decides one of the document storing apparatuses as a storing destination, based on a document color attribution showing whether the document to be stored is a monochrome document or a color document and an apparatus color attribution showing whether each of the document storing apparatus is a monochrome apparatus or a color apparatus.

13. The document administering apparatus as recited in claim 8, wherein the controller creates a box corresponding to the one of the boxes decided by the storing destination deciding portion in the one of the document storing apparatuses decided by the storing destination deciding portion when the one of the boxes decided by the storing destination deciding portion does not exist in the one of the document storing apparatuses decided by the storing destination deciding portion.

14. A non-transitory computer readable recording medium in which document administering program for making a computer execute the steps is recorded, the steps comprising:
a document storing apparatus registering step for registering information on a plurality of document storing apparatuses connected with each other to a network, each of the document storing apparatuses having boxes for storing various information in a sorted manner;
a box information obtaining step for obtaining information on the boxes from each of the document storing apparatuses;
a storing request receiving step for receiving a storing request of a document;
a storing destination deciding step for automatically deciding which one of the plurality of document storing apparatuses and which one of the plurality of boxes thereof for actually storing the document, based on any one of information including information on the document corresponding to the storing request received in the storing request receiving step, information on the document storing apparatuses registered at the document storing apparatus registering step and information on the boxes obtained at the box information obtaining step; and
a storing controlling step for transmitting the document to the one of the document storing apparatuses having the one of the boxes determined at the storing destination deciding step and making the one document storing apparatus store the document in the one of the boxes.

15. The non-transitory computer readable recording medium as recited in claim 14, wherein at the storing destination deciding step the one of the document storing apparatuses and the one of the boxes thereof are decided based on a user name of a user who made the storing request and a box name specified by the user.

16. The non-transitory computer readable recording medium as recited in claim 14, wherein at the storing destination deciding step the one of the document storing apparatuses and the one of the boxes thereof are decided on a size of the document to be stored and a free space of each of the boxes of each of the document storing apparatuses.

17. The non-transitory computer readable recording medium as recited in claim 14, wherein at the storing destination deciding step the one of the document storing apparatuses and the one of the boxes thereof as a storing destination is decided based on a size of the document to be stored and a productivity rate of each of the document storing apparatuses.

18. The non-transitory computer readable recording medium as recited in claim 14, wherein each of the document storing apparatuses is an image forming apparatus, and
wherein at the storing destination deciding step the one of the document storing apparatuses as a storing destination is decided based on a document color attribution showing whether the document to be stored is a monochrome document or a color document and an apparatus color attribution showing whether each of the document storing apparatuses is a monochrome apparatus or a color apparatus.

19. The non-transitory computer readable recording medium as recited in claim 14, wherein at the storing controlling step a box corresponding to the one of the boxes decided by the storing destination deciding step is created in the one of the document storing apparatuses decided by the storing destination deciding step when the one of the boxes decided by the storing destination deciding step does not exist in the one of the document storing apparatuses decided by the storing destination deciding step.

* * * * *